United States Patent [19]

Fond et al.

[11] Patent Number: 5,096,232
[45] Date of Patent: Mar. 17, 1992

[54] APPARATUS FOR THE RAPID AND THE AIR AND WATER TIGHT JOINING OF PIPES

[75] Inventors: Olivier Fond, Le Pecq; Jean-Louis Brunet, Chavenay, both of France

[73] Assignee: Degremont, Rueil-Malmaison, France

[21] Appl. No.: 654,733

[22] Filed: Feb. 18, 1991

Related U.S. Application Data

[63] Continuation of Ser. No. 389,187, Aug. 13, 1989, abandoned.

[30] Foreign Application Priority Data

Aug. 9, 1988 [FR] France ................... 88 10744

[51] Int. Cl.⁵ ............................................. F16L 41/00
[52] U.S. Cl. ...................................... 285/55; 285/156; 285/194; 285/353; 285/921
[58] Field of Search ............... 285/156, 162, 189, 319, 285/321, 353, 357, 921, 55, 194, 197, 205, 214, 222, 354, 362, 376, 901

[56] References Cited

U.S. PATENT DOCUMENTS

| | | | |
|---|---|---|---|
| 1,106,761 | 8/1914 | Weikert et al. | 285/205 X |
| 2,021,745 | 11/1935 | Pfefferle et al. | 285/353 X |
| 2,226,039 | 12/1940 | Wiltse | 285/353 X |
| 2,514,504 | 7/1950 | Moline | 285/921 X |
| 2,537,183 | 1/1951 | Bloomer | 285/222 X |
| 2,566,502 | 9/1951 | Smith | 285/189 X |
| 2,613,958 | 10/1952 | Richardson | 285/353 X |
| 2,856,215 | 10/1958 | Schlosser et al. | 285/189 X |
| 3,222,093 | 12/1965 | Simmons | 285/194 X |
| 3,231,300 | 1/1966 | Moroney | 285/921 X |
| 3,272,542 | 9/1966 | Haulik et al. | 285/189 |
| 3,489,441 | 1/1970 | Malcolm | 285/379 X |
| 4,018,459 | 4/1977 | Mominee et al. | 285/921 X |
| 4,441,744 | 4/1984 | Oostenbrink et al. | 285/921 X |
| 4,494,779 | 1/1985 | Neff et al. | 285/921 X |
| 4,606,562 | 8/1986 | Saraceno | 285/159 |
| 4,627,648 | 12/1986 | Montpetit | 285/194 X |
| 4,765,661 | 8/1988 | Fukushima et al. | 285/353 X |
| 4,773,474 | 9/1988 | Stay | 285/319 X |

FOREIGN PATENT DOCUMENTS

| | | | |
|---|---|---|---|
| 1503444 | 10/1967 | France . | |
| 373606 | 1/1964 | Switzerland . | |
| 13936 | 7/1908 | United Kingdom | 285/162 |
| 1313069 | 4/1973 | United Kingdom . | |

*Primary Examiner*—Randolph A. Reese
*Assistant Examiner*—Jeffrey L. Thompson
*Attorney, Agent, or Firm*—Roland Plottel

[57] ABSTRACT

A device for attaching a pipe (A) to an opening 2) in a curved wall (B). The device includes a connector (1), and a gasket (12). The connector (1) has a tubular inner surface to receive the pipe (A), a central portion (11) surrounded by the gasket (12), and a plurality of teeth (10) extending axially outwardly from the central portion (11) with ledges on the teeth extending radially outward and at least two of the teeth facing each other and being of equal length. The teeth (10) are adapted to fit into the curved wall opening (2). The connector has a shoulder (13) at an end opposite the teeth, with an inner ledge on the shoulder facing the ledges on the teeth and adapted to compress the gasket (12) between the shoulder inner ledge and an outside surface of the curved wall adjacent the opening (2). The teeth are sufficiently rigid to allow rotation of the connector once the at least two facing teeth have engaged an inside surface of the wall opening, whereby rotation of the connector and the engagement of the teeth with the inside surface of the wall provides a means for axially translating the piece into the opening and for squeezing the gasket between the inner shoulder ledge and an outside surface of the curved wall adjacent the opening.

8 Claims, 2 Drawing Sheets

APPARATUS FOR THE RAPID AND THE AIR AND WATER TIGHT JOINING OF PIPES

This application is a continuation of application Ser. No. 071389,187, filed 8/3/89, now abandoned.

The present invention relates to a device or fixture for bringing about the quick and tight (i.e. air and water tight) joining together of two pipes. This device is particularly applicable for use in a network for the distribution of fluids, the kind in which there are several branch pipes which are connected to and fed by a principal pipe or main. This device is particularly useful for making connections between the branch pipes and main.

The device, according to one aspect of the invention, has a piece, made preferably of molded plastic, having an anchoring system constituted by a plurality of teeth. These teeth are introduced into an appropriately sized opening in the main and grip the inside wall of the main at the opening. The teeth are connected at their other end to a central portion of the piece, which provides a mounting for a gasket surrounding the central portion above the main and forming a watertight fit with the outside of the opening. The other end of the piece has a threaded fitting which receives a nut that tightens onto the gasket, thus assuring a tight attachment onto the main. An O-ring is also interposed between the nut and the other end of the piece.

If the branch pipe is a support pipe for an elastomeric sleeve, then the sleeve is slipped over the pipe and one of the ends of the sleeve is fitted over the O-ring of the device, with the nut tightening the end of the sleeve against the O-ring. At the other end of the sleeve there is a second O-ring which the sleeve fits over, and which is also tightened together by a nut or screw-fitting.

The characteristics and the several advantages of the invention will be apparent from the following description, which is one embodiment of the possible forms of implementing the invention and which is shown only by way of example and is not to be construed as limiting the invention.

In the drawings and in the description, like members have like legends.

DESCRIPTION OF THE PREFERRED EMBODIMENTS

An example where the device will find application is for use in a network for distributing a gas such as oxygen or air, into a liquid such as water, which is to be enriched with oxygen, in a system for treating water by an aerobic process. One such network has branch pipes A with perforations, and which branch pipes lead out from a principal pipe or main B. A goal in such a network is to connect conveniently—that is to say rapidly and tightly without having to use special tools—the branch pipes onto the main pipe.

This goal is achieved by the device of the invention.

Figure 2:
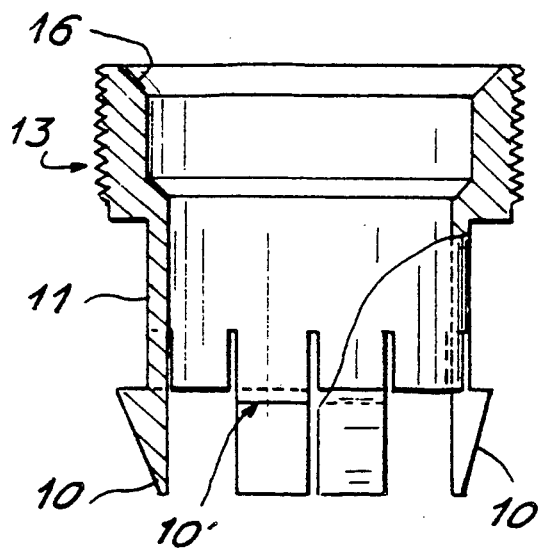
FIG. 2 is a cross-sectional view of the principal connective element of the device.
Figure 3:
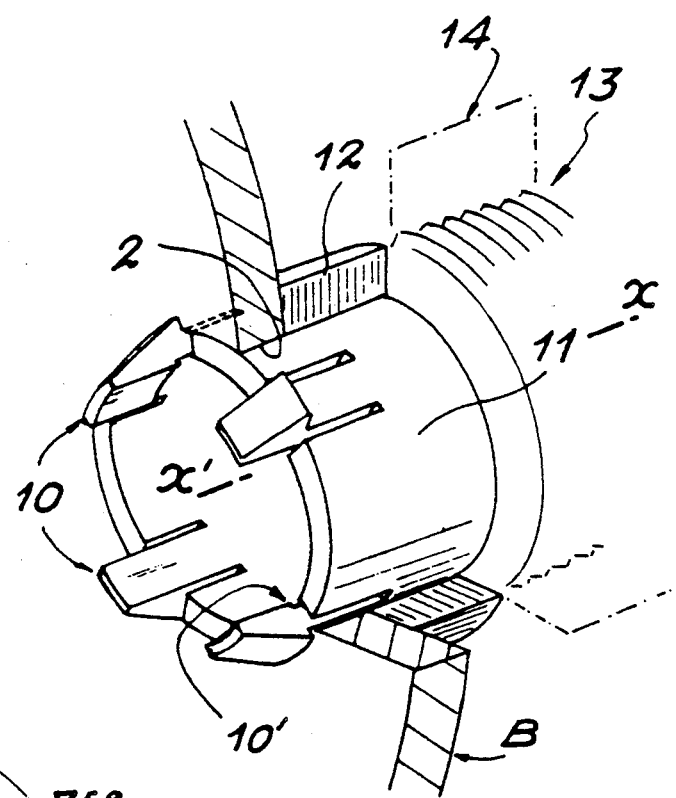
FIG. 3 is a perspective view, partially cut away, of the device according to the invention and showing the device connected to an opening in a main.

The device has a connector 1 which is shown in detail in FIG. 2. This connector is advantageously made of a molded plastic and has a plurality of teeth 10, which are introduced into an opening 2 of proper size in the main B. After the teeth 10 there is a recessed portion or collar 11, which is surrounded by a gasket 12 made of a compressible deformable material; then there is a shoulder 13, which is threaded and on which there is tightened a nut 14. At a joint there-between, an O-ring 15 is mounted between a conical face 16 at the upper end of connector 1 and a gasket 17 on which there is applied a screw down force from nut 14. Thus, there is made a mounting by the connector 1 of the pipe A on the main B.

The connector 1 is first introduced longitudinally into the opening 2 of the main B until the first teeth grip on the internal walls of the latter; and the connector 1 is given a rotational movement. This movement causes a longitudinal translation of the connector, and from which there is a change in the relationship of some of the teeth with the internal wall of the main; and there is a compression of the gasket 12.

Pipe A is then introduced into connector 1 until the level of the teeth. The teeth then spread out to form a tight block onto the internal surface of the main B. The connector 1 is in this condition perfectly attached.

The mounting of the connection is completed by tightening the nut 14 onto the shoulder 13 and which compresses the O-ring 15 into place and thus completes the attachment of the pipe A onto the main B.

It has thus been shown, in this example, that there is the tight anchoring of pipe A onto the main B.

In the example just described and shown in the FIGURES, the connector has 4 teeth.

The number of teeth, it should be understood, may be larger and may be practically between 2 and 20.

Figure 4:
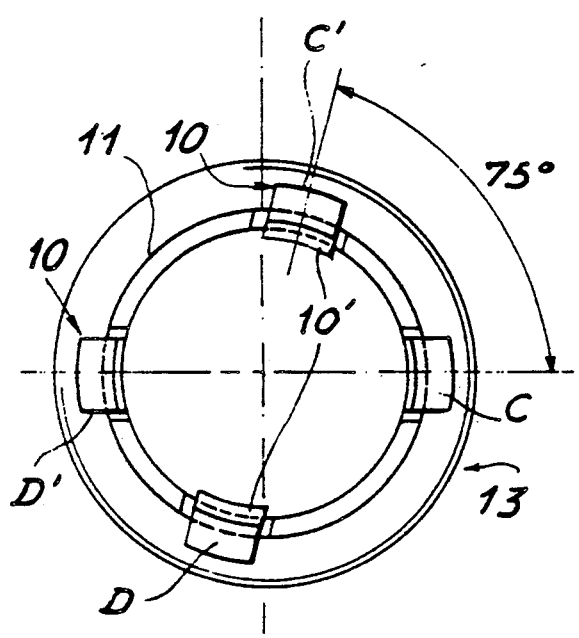
FIG. 4 in section is a view showing the relationship of the teeth on the connection device.

The teeth should be disposed symmetrically in relation to the axis x—x' of the pipe to be joined. In order to obtain both the maximum desirable compression of the compression piece (gasket 12), and the optimal position for the stability of the piece to be joined, as is shown in FIG. 4, the teeth are arranged symmetrically in groups-—the angular distance between the extremities of the teeth C—C' and D—D' of each group is advantageously 75°, as shown in FIG. 4, but may range 60° to 90°.

Figure 1:
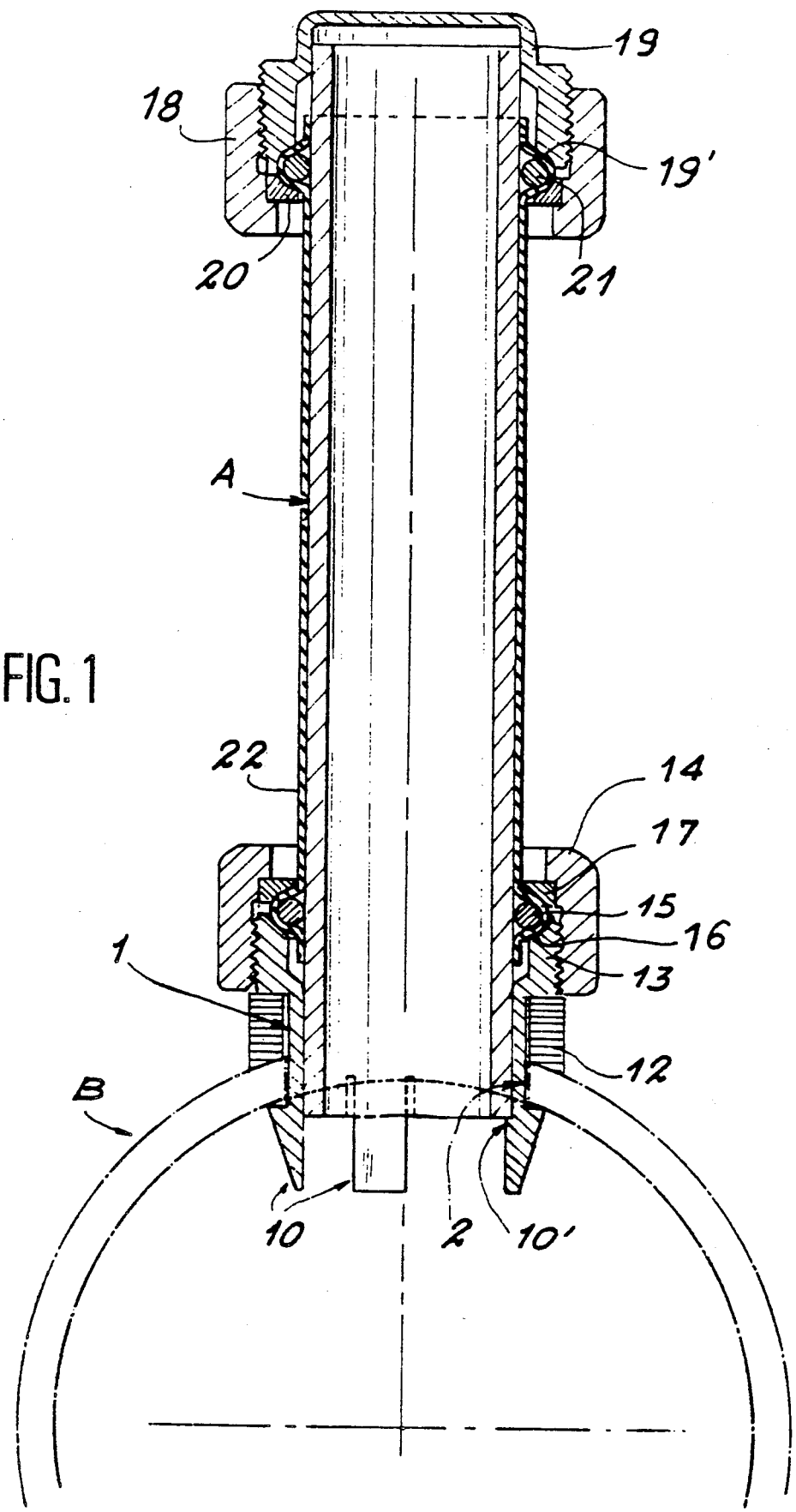
FIG. 1 is a cross-sectional view showing the connection of a branch pipe onto a main by means of a connection device according to the invention.

The device of the invention may advantageously also include a cap 19 (shown in FIG. 1), which is screwed onto the free end of pipe A. In this embodiment there is a threaded nut 18, a gasket 20, and an O-ring 21. An internal shoulder 19' of the cap is conical in such a manner that it does not damage the O-ring 21.

In the case where the pipe A to be joined to the main is a support pipe for a perforated sleeve of an elastomeric material, this sleeve 22 is mounted on the pipe around the O-ring 15 and if a cap is used, equally around the O-ring 21. The extension of the sleeve over the O-rings brings about the compression of the O-rings on the support pipe and an excellent adhesion of the sleeve itself onto the O-ring and thus enhances the resulting tightness of the system. The quality of the tightness is thus improved by this O-ring which itself is of an elastomeric material. Thus, this permits a thickness of the elastic material with the O-ring to be much greater than the thickness of the sleeve alone. This is more favorable to the compression seal (for example, the ratio of the thickness can range from 1 to 5, to 1 to 20, for a thickness of the membrane of 0.5 to 3 millimeters).

The device of the invention may also be used for joining a pipe to any section or to any wall.

It is sufficient to insert the connection into the opening made in the main, or in a hole of suitable shape, which may be in a flat built-up piece and then to push the connection until there is a complete penetration of the teeth, which can be odd or even in number, through the opening until they anchor themselves on the wall of the main or on the flat built-up piece. The gasket 12 may, in this case, be thicker, and of a suitable density, to assure the strength of the connection and the tightness of the mounting.

One sees, by what has just been described, that the device of the invention permits the joining of two pipes in a simple and economical way without the necessity of using specialized tools and without highly skilled labor, where the need for attachment between the two pipes is rapid and tight whether the pipes be of the same section or different cross-sections, of the same shape, or of different shapes.

It should be added that the taking apart of the connection may be done easily. It is enough to use common tools as the teeth of the connector of the invention easily release themselves once the branch pipe has been removed.

Notches, which are not shown but which are in pipe A, may rest on the lips 10' which are on the teeth, permitting the transfer to the connector 1 the rotational movement which is given to pipe A. After the turning and ratcheting down of the teeth, pipe A is then introduced up to the extremities of the teeth and correctly positioned by rotation. The teeth are thus locked onto the internal face of the main B. The connector 1 is in this state perfectly attached.

It should be understood that the invention is in no way limited to the preferred embodiment described and shown by way of example, but may be used with several variations without departing from the scope and spirit of the invention.

The practical construction of the parts, according to the invention, would be by an injectable plastic material, and this should lead to a very inexpensive product and would also avoid difficulties of possible corrosion or of electrical coupling where the connection is metallic.

We claim:

1. A branch pipe assembly and connecting device comprising a piece having at one end an anchoring system constituted by a plurality of equal length teeth which are adapted to be introduced into a measured opening made in the principal pipe, a central portion serving as a mount for a gasket to render said connection impervious, at least two of said teeth facing each other and being sufficiently rigid to allow rotation of said piece once said at least two facing teeth have engaged an inside surface of said principal pipe adjacent said opening, whereby during said rotation of said piece the engagement of said teeth with the inside surface of said principal pipe provides a means for axially translating said piece into said opening and squeezing said gasket between a portion of said piece and an outside surface of said principal pipe adjacent said opening, the other end of said piece having a threaded portion, said threaded portion adapted to receive a nut which may be tightened wherein said piece is adapted to receive a branch pipe coaxially therein, and an O-ring interposed between the nut and the other end of the piece for rendering the connection between the branch pipe and the piece impervious when said nut is tightened.

2. A device according to claim 1 wherein the number of teeth of the device is between 2 and 20, and these teeth are symmetrically positioned in relation to the axis of the branch pipe being connected.

3. A device according to claim 1 wherein the teeth are arranged in circumferentially spaced groups, and the circumferential angle between the outermost teeth of each group is between 60° and 90°.

4. A device according to claim 1, further comprising a capping piece attached to a free end of the branch pipe, said capping piece having a first portion covering the free end of the branch pipe and a co-axially threaded portion extending over an adjacent outside surface of the branch pipe, an O-ring mounted at an end of said threaded portion opposite said first portion, and a blind nut which is screwed onto the capping piece while compressing the O-ring, thereby facilitating imperviousness of the cap.

5. A device according to claim 4, further comprising an elastomeric sleeve extending over a portion of the branch pipe, with the ends of the sleeve covering the O-rings of the device and capping piece, whereby compression of the O-ring on the pipe and the compression of the sleeve by tightening the nut brings about an improved imperviousness of the entire assembly.

6. A device according to any one of the preceding claims wherein to facilitate said rotation of the piece engaging the teeth in the principal pipe some of the teeth have tabs (10') which cooperate with notches in the branch pipe (A).

7. A device according to any one of the preceding claims 1–4, wherein said piece is made of a molded plastic material.

8. A device for connecting a pipe (A) to an opening (2) in a curved wall (B) comprising a connector (1), a gasket (12), a cap nut (14), and an O-ring (15); said connector (1) having a tubular inner surface to receive a pipe (A), a central portion (11) surrounded by said gasket (12), and a plurality of teeth (10) extending axially outwardly from said central portion (11) with ledges on said teeth extending radially outward and at least two of said teeth facing each other and being of equal length; said teeth (10) adapted to fit into a wall opening (2); said connector having a threaded shoulder (13) at an end opposite the teeth, with an inner ledge on the shoulder facing the ledges on the teeth and adapted to compress the gasket (12) between said shoulder inner ledge and an outside surface of the curved wall adjacent the opening (2); said teeth being sufficiently rigid to allow rotation of said piece once said at least two facing teeth have engaged an inside surface of said principal pipe adjacent said opening, whereby during said rotations of said piece the engagement of said teeth with the inside surface of said principal pipe provides a means for axially translating said piece into said opening for squeezing said gasket between said inner shoulder ledge and an outside surface of the curved wall adjacent said opening; said threaded shoulder providing means for receiving said cap nut (14); said O-ring (15), when a pipe (A) is mounted inside said connector tubular inner surface, being positioned between an outer edge (16) of the shoulder, an outer surface of said pipe, and said cap nut; said teeth ledges providing a means for grasping the inside surface of said curved wall adjacent the opening wherein the gasket is compressed between the outside surface of the wall adjacent the opening and the shoulder inner ledge, and the cap nut and threaded shoulder hold the O-ring tight against the connector and the pipe, thereby assuring a water and air tight connection of the pipe in the opening.

* * * * *